US007116699B2

(12) United States Patent
Batra et al.

(10) Patent No.: US 7,116,699 B2
(45) Date of Patent: Oct. 3, 2006

(54) FREQUENCY RE-MAPPING FOR STRUCTURE ADAPTIVE FREQUENCY HOPPING

(75) Inventors: Anuj Batra, Dallas, TX (US); Kofi Dankwa Anim-Appiah, Allen, TX (US); Jin-Meng Ho, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 881 days.

(21) Appl. No.: 10/003,865

(22) Filed: Nov. 2, 2001

(65) Prior Publication Data
US 2002/0191678 A1 Dec. 19, 2002

Related U.S. Application Data

(60) Provisional application No. 60/275,542, filed on Mar. 12, 2001.

(51) Int. Cl.
*H04B 1/713* (2006.01)
*H04B 1/69* (2006.01)

(52) U.S. Cl. .................. 375/132; 375/133; 375/136

(58) Field of Classification Search ............. 375/132, 375/133, 136, 267; 455/464; 370/344, 346
See application file for complete search history.

(56) References Cited

U.S. PATENT DOCUMENTS

| 4,780,885 | A | * | 10/1988 | Paul et al. ............. 375/267 |
| 5,323,447 | A | * | 6/1994 | Gillis et al. ............ 455/464 |
| 5,333,153 | A | * | 7/1994 | Brown et al. ........... 375/351 |
| 6,704,346 | B1 | * | 3/2004 | Mansfield ............. 375/136 |
| 2002/0191678 | A1 | * | 12/2002 | Batra et al. ............ 375/132 |
| 2003/0058923 | A1 | * | 3/2003 | Chen et al. ............ 375/133 |
| 2003/0081654 | A1 | * | 5/2003 | Cooklev et al. ......... 375/132 |
| 2003/0147453 | A1 | * | 8/2003 | Batra ................. 375/132 |

* cited by examiner

*Primary Examiner*—Kevin Burd
*Assistant Examiner*—Ted M. Wang
(74) *Attorney, Agent, or Firm*—Steven A. Shaw; W. James Brady; Frederick J. Telecky, Jr.

(57) ABSTRACT

The invention generally provides a method of intelligent frequency hopping such as in Bluetooth and Home RF networks. The method (400) includes the acts of generating windows (410), sampling an original frequency (430), determining if the original frequency is of a desired frequency type (440), using the original frequency when the original frequency is the desired frequency type (460), and mapping the frequency to the desired frequency type when the original frequency is not the desired frequency type (450). Accordingly, the method increases the reliability and throughput of wireless networks.

19 Claims, 4 Drawing Sheets

FREQUENCY RE-MAPPING FOR STRUCTURE ADAPTIVE FREQUENCY HOPPING

This invention is related to and claims priority under 35 U.S.C. §119(e)(1) from the following U.S. Provisional Patent Application: Ser. application No. 60/275,542 by Batra, et al., entitled, "An Intelligent Frequency Hopping Scheme for Improved Bluetooth Throughput in an Interference-Limited Environment" and filed on Mar. 12, 2001. The aforementioned patent application is hereby incorporated by reference.

TECHNICAL FIELD

The invention generally relates to wireless protocols, and, more particularly, the invention relates to devices and methods that enhance the operation of frequency hopping protocols.

STATEMENT OF A PROBLEM ADDRESSED BY THE INVENTION

Wireless networks, such as Bluetooth, are a wireless replacements for low data-rate wired connections, such as parallel and serial cables. These networks operate in the 2.4 GHz Industrial, Scientific, and Medical (ISM) band. This technology is a Frequency-Hopping Spread Spectrum (FHSS) system that changes frequency (also called "hopping") at a rate of 1600 Hz over 79 1-MHz-wide channels (typically numbered channel zero, channel one, etc.). Over time, a Bluetooth signal actually occupies 79 MHz of the available 83.5 MHz in the ISM band. The channel access mechanism for a Bluetooth device is a slotted protocol.

Presently, a Bluetooth network consists of a single master and up to seven slaves. The master and the slave(s) are required to transmit on an even and an odd time slot, respectively. Time slots dedicated to the master are referred to as master-to-slave time slots, while the time slots dedicated to the slave are referred to as slave-to-master time slots. Each time slot spans 625 microseconds. Depending on the packet type selected by either the master or the slave, a Bluetooth packet can occupy 1, 3, or 5 time slots. The maximum data rate that a Bluetooth device can support is 1 Mbps.

The 2.4 GHz ISM band is an unlicensed band (meaning that anyone may use the spectrum of this band as long as they comply with the specified spectrum usage regulations.). This band has been set by the Federal Communications Commission (FCC) of the United States. Several other countries, including the majority of Europe, have also set aside this radio frequency (RF) spectrum as an unlicensed band. Some of the other devices that occupy this unlicensed band include IEEE 802.11 wireless networks and cordless phones. Interestingly, microwave ovens also radiate energy within this band.

Bluetooth networks use a frequency hopping mechanism, meaning that a Bluetooth transmission changes the transmission frequency after each packet. Accordingly, when another device is operating in a frequency that is also used by the Bluetooth network, mutual interference between Bluetooth and the other device operating in the 2.4 GHz ISM band can and does occur.

From the perspective of a Bluetooth device, these other devices appear as static interferers. The net effect of this interference is an increase in the packet error rate and a corresponding decrease in the effective data transfer rate (throughput). In fact, in the presence of interference, the data transfer rate (throughput) may drop to only a fraction of the maximum. The present invention describes a method for structuring the hopping sequence to minimize the effects of the static interference. This invention also describes a technique for generating the structured hopping sequence from the original (legacy) hopping sequence.

Interference Issues

Many wireless protocols, such as Bluetooth, are generally interference limited systems meaning that interference can limit throughput and packet transfer rates. The S-to-R (signal to noise ratio) requirement of wireless systems is such that the signal needs to be strong enough so that it can be discerned over system interference (noise), which enables data i.e. a packet to be demodulated. Some exemplary sources of interference in 2.4 GHz band include 802.11 networks, cordless phones, and microwave ovens. When interference is present, interference is the dominant source of degradation in Bluetooth systems. Even if there is no interference, Bluetooth may be limited by other factors, such as multipath problems. Multipath problems are where signal reflections that bounce off walls, trees, buildings, and other physical objects cause difficulty in signal reception and translation.

The 802.11 networks are a source of interference because 802.11 signals occupy the 2.4 GHz band. The 2.4 GHz is an unlicensed band, so anything that meets minimal FCC requirements as specified by the FCC is allowed to operate in the 2.4 GHz band. Hence, any other device that operates in the 2.4 GHz band will eventually collide with Bluetooth transmissions and create interference because the Bluetooth protocol hops (changes) its operational frequency through almost the entire band. Thus, if a Bluetooth transmission hops to a frequency where another device is transmitting, then the transmissions overlap in frequency. If they also overlap in time (occur at the same time), then a collision of transmissions occurs and interference results (basic physics teaches that two things cannot occupy the same space at the same time). Accordingly, interference from an 802.11 network degrades packet transmission, and degrades the ability to decode a packet.

A microwave oven is another device that produces interference in the 2.4 GHz band. So, if a microwave oven is operating in proximity to a Bluetooth network, then the Bluetooth network will eventually hop to a frequency including noise from the microwave oven. Thus, Bluetooth packets will likely be lost and the system will suffer degradation and decreased throughput. In addition, some cordless phones are 2.4 GHz devices and are thus another source of interference because they also occupy the 2.4 GHz band.

Cordless devices and networks usually employ an upstream channel and a downstream channel each separated in frequency, which is known as "frequency division duplex." So, as interference increases, the throughput for Bluetooth-based networks and devices drops and the packet error rate (PER) increases. Thus, to increase throughput in an interference limited environment, a Bluetooth device must use some kind of "coexistence mechanism", or, in other words, it must have some mechanism that can recognize interference, and then do something intelligently to either eliminate the interference or to deal with the interference. The present invention deals with interference intelligently.

SUMMARY OF THE INVENTION

The present invention achieves technical advantages as a method of reducing total packet loss in a wireless system by having a "grouping of good channels" (called a good window) followed in time by a "grouping of bad channels" (called a bad window) in an Asynchronous Connection-Less Link (ACL link). Then, the grouping of good channels and the grouping of bad channels are each segregated into a first portion of even-numbered channels, and a second portion of odd-numbered channels. To increase throughput, the invention uses the original frequency when it is the type of frequency that the system desires to transmit, and maps the original frequency to the desired type of frequency then the original frequency is not the type of frequency the system desired to transmit.

There are two links within Bluetooth: AN ACL Link that is a data link used for transmitting data, and a synchronous connection oriented link, which is used for transmitting voice communication. This invention takes into account the fact that many packet transmissions require more than one time slot to complete. An errant transition between a good channel to/from a bad channel typically results in either a retransmission, which reduces the amount of bandwidth that can be used to transmit data, or idle time slots (in Bluetooth) resulting from a slave device not receiving a command.

Since the window of bad channels is known, concern over losing transmitted packets is reduced because it is known that nothing is likely to get through during the time slots allocated to bad channels. Accordingly, there is an Automatic Repeat reQuest (ARQ) mechanism, which is an automatic retransmission protocol, that allows packet retransmission for packets that were not delivered correctly the first time. So, the protocol will continue to try to deliver those packets and there should not be a loss of data, though there may be a loss of time.

The second type of link in Bluetooth is a synchronous connection oriented link which is for voice, a primary application of Bluetooth. Grouping good channels and bad channels insures a predictable distribution of channels across a "hopping sequence" for a master device (master) that is transmitting to a slave device (slave), and for a slave that is transmitting to a master. Therefore, when both directions of transmission are provided with the same amount of degradation, they both suffer the same amount of packet loss, because they both experience the same number of bad channels. This provides some consistent (not dependent on the direction of transmission), predictable level of Quality Level of Service (QLS). This insures that if a person can hear a transmission, they can also have confidence that the person they are talking to can also hear them.

The bad channels are grouped, and then the groupings are spread out evenly among frequencies or time slots, such as Bluetooth time slots. So, the invention avoids extended periods of time i.e. several time slots having poor or no transmissions. For example, if all the bad channels arrive in twenty consecutive slots, a listener will not hear anything on a voice channel for the twenty consecutive slots. Accordingly, it is desired to spread the bad channel groupings out, and make the distance (in time) between bad channel groupings as large as possible by separating them with groupings of good channels.

Some of the benefits of grouping (for Bluetooth in particular) is that packet loss is minimized, throughput is increased, and some known level of QLS can be provided. By concentrating interference over a concentrated period of time, the invention also has known benefits for devices in the 2.4 GHz band (such as 802.11 networks). The 802.11 devices experience less packet loss because retransmissions take place during the "window" (time period) comprised of bad channels, which is known, and so they suffer fewer packet losses. The alternative distribution of bad channels over numerous, random time slots, "hits" many more packets with a bad time slot—this is important because if a single bad channel is used to transmit a packet, then the entire packet must be retransmitted. Accordingly, additional time savings accrue since the transmission requests themselves require considerable time.

In one embodiment the present invention is generally a method of intelligent frequency hopping. The method includes the acts of generating windows, sampling an original frequency, determining if the original frequency is of a desired frequency type, using the original frequency when the original frequency is the desired frequency type, and mapping the frequency to the desired frequency type when the original frequency is not the desired frequency type. Accordingly, the method increases the reliability and throughput of wireless networks.

Of course, other features and embodiments of the invention will be apparent to those of ordinary skill in the art. After reading the specification, and the detailed description of the exemplary embodiment, these persons will recognize that similar results can be achieved in not dissimilar ways. Accordingly, the detailed description is provided as an example of the best mode of the invention, and it should be understood that the invention is not limited by the detailed description. Accordingly, the invention should be read as being limited only by the claims.

BRIEF DESCRIPTION OF THE DRAWINGS

Various aspects of the invention, as well as an embodiment, are better understood by reference to the following EXEMPLARY EMBODIMENT OF A BEST MODE. To better understand the invention, the EXEMPLARY EMBODIMENT OF A BEST MODE should be read in conjunction with the drawings in which.

AN EXEMPLARY EMBODIMENT OF A BEST MODE

Introduction

Figure 1A:
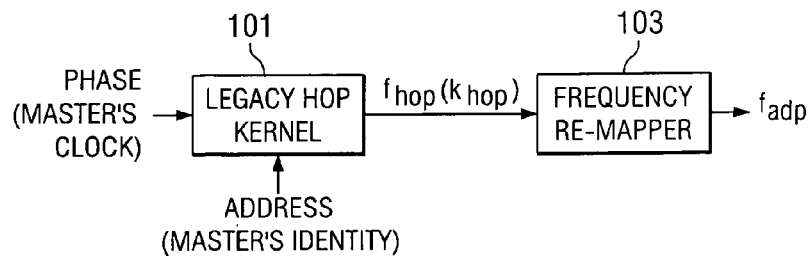
FIG. 1A is a block diagram of a reduced set adaptive frequency hopping mechanism.

The invention provides a new and useful channel hopping (or frequency changing) sequence and system using such sequence. Frequency bands are divided into many channels. For example, the FM Radio band is divided into many FM channels, each capable of transmitting a separate stereo event. Current law (for wireless computer networks that hop) requires that, over time, every channel in a defined channel band be used, regardless of channel quality. Furthermore, law requires that, over time, each channel be used an approximately equal number of times. However, since data (hereinafter meaning data, voice, video, or any other network transmission) may take several time periods (called slots) to transfer, and since typically a channel is changed for each time slot, when a bad channel is encountered, poor system performance results. For example, hopping into a bad channel results in the loss of all previously sent data, and requires that additional "handshaking," or connection protocols, be used to re-establish the transmission of the data. The invention greatly reduces these problems.

First, good channels are grouped together to form a good window, and bad channels are grouped to form a bad window together. Then, a communication system hops from a known good channel to a known good channel until the good window, having a predetermined number of good channels, has been used, then the communication system hops from a known bad channel to a known bad channel until the predetermined number of bad channels in the bad window have been used. Accordingly, the system will know when bad channels will be encountered, and for how long the bad channels will be encountered. This enables a system to send no data, or less critical data, in time slots designated to bad channels. By channel hopping in this sequence, packets are lost every so often, but in a predictable manner, thus enabling a known Quality Level of Service (QLS). Also, the grouping of channels improves throughput in terms of packets/second, particularly for 802.11 networks.

Recall that a Bluetooth device hops over 79 different channels. The exact hopping sequence for the network (also called a "piconet") is determined by the address, as well as the clock of the Bluetooth master. Each hop represents a time slot during which a Bluetooth device can transmit a packet. A time-division duplex (TDD) scheme is used to control the access to the medium. In this scheme, the master and slave are allowed to transmit on the even and odd slots, respectively. Each device may transmit packets that can occupy 1, 3, or 5 time slots. The RF frequency for a hop will remain fixed for the duration of a packet. For the case of a multi-slot packet, the Bluetooth device will use the RF frequency associated with the first slot for the entire length of the packet.

Two different types of links can be established between the master and slave(s): a synchronous connection-oriented (SCO) link, and an asynchronous connection-less (ACL) link. The SCO link is a symmetric, point-to-point link between the master and any single slave within the piconet. Since the SCO link typically supports time-bounded information like voice, the SCO packets are never retransmitted. The master maintains the SCO link with the slave by reserving slots at regular intervals. The master transmits SCO packets in the reserved master-to-slave slots, while the SCO slave always responds in the following slave-to-master slot. Even though an SCO packet only occupies a single slot, its frequency of transmission depends on the coding scheme used. An SCO packet protected with a rate ⅓ FEC (HV1) is transmitted every other slot, while an SCO packet protected with a rate ⅔ FEC (HV2) is transmitted every fourth slot. A SCO packet not protected by FEC (HV3) is transmitted every sixth slot.

The ACL link is a point-to-multipoint link between the master and all of the slaves. During slots not reserved for the SCO link(s), the master can establish an ACL link on a per-slot basis with any slave in the piconet, including slave(s) already engaged in an SCO link. Note that only a single ACL link can exist between a master and a slave. Because ACL packets typically convey data, an ARQ protocol is used to maintain the integrity of the transmitted information. For an ACL link, the Bluetooth master is truly the master of the piconet. For example, a slave can only respond with an ACL packet in the slave-to-master slot if and only if it has been successfuly addresses in the preceding master-to-slave slot. Depending upon the packet type, an ACL packet can occupy 1 (DM1/DH1), 3 (DM3/DH3), or 5 (DM5/DH5) slots.

Abbreviations and Notations

Some abbreviations and notations are used throughput this document. Unless otherwise stated, the abbreviations and notations are defined as follows:

S=set all of channels in the 2.4 GHz ISM band.
SG=set of good channels
SBU=set of bad channels to be kept from the original hopping sequence.
SBR=set of bad channels to be removed from the original hopping sequence.
Nmin=minimum number of hop channels (typically set by regulators)
NG=number of good channels (NG=number of elements in SG)
NBU=number of bad channels to be kept from the original hopping sequence (NBU=number of elements in SBU).
NBR=number of bad channels to be removed from the original hopping sequence (NBR=number of elements in SBR).
Fhop=next hop-frequency.
Khop=index that points to the next hop-frequency.
Fadp=next adapted hop-frequency.

In the US, the value of Nmin is set at 75 hop-frequencies by the FCC; while in Europe, Nmin is set at 20 by ESTI.

Description of Figures

The invention provides a channel hopping sequence. Generally, good channels are grouped together to form a good window, and bad channels are grouped together to form a bad window. Then, a communication system hops from a known good channel to another known good channel until a predetermined number of good channels (a window size) have been used, then the communication system hops from a known bad channel to another known bad channel until a predetermined number of bad channels have been used.

One approach for adaptive frequency hopping is to hop over a reduced set of hopping frequencies that are deemed to be free of interference. In other words, this approach hops over only the good channels. A block diagram for this approach is shown in FIG. 1A. Accordingly, FIG. 1A is a block diagram of a reduced set adaptive frequency hopping mechanism. A master clock and the master's address are fed into a Legacy Hop Kernel 101 which hops over frequencies in a predetermined, perhaps random, sequence. The output of the Legacy Hop Kernel 101 is the selected frequency. The selected frequency is then examined by a re-mapper 103. The re-mapper 103 functions such that good channels pass through the re-mapper 103 unchanged, while bad channels are mapped onto a set of good channels.

Figure 1B:
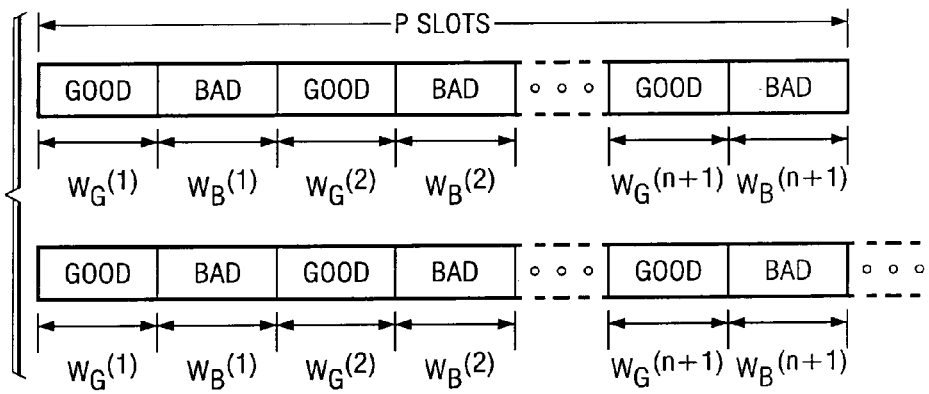
FIG. 1B is a general overview of a structured adaptive hopping sequence that minimizes the effects of interference.

FIG. 1B is a general overview of a structured adaptive hopping sequence that minimizes the effects of interference. This shows that the structured adaptive hopping sequence has WG(1) successive frequencies from the set of good channels (SG), followed by WB(1) successive hop-frequencies from the set of bad channels to be kept in the adapted hopping sequence (SBU), followed by WG(2) successive hop-frequencies from the set of good channels (SG), and so on. This structure does not specify the exact frequencies at each slot, but does require that the hop-frequency be within a particular set. This structure can be periodic with period P slots when view from the perspective of the different sets. Note that the window lengths should be even in order to work within the Bluetooth framework and protocol.

Furthermore, the window lengths need not be constant, i.e., WG(1) and WG(2) need not be equal, and that n is an arbitrary number. When the hopping sequence is viewed from the perspective of the sets, there is a pattern (grouping of hop-frequencies from the same set) and periodicity. However, when the hopping sequence is viewed from the perspective of the hop-frequencies, the sequence appears to be random.

Figure 1C:
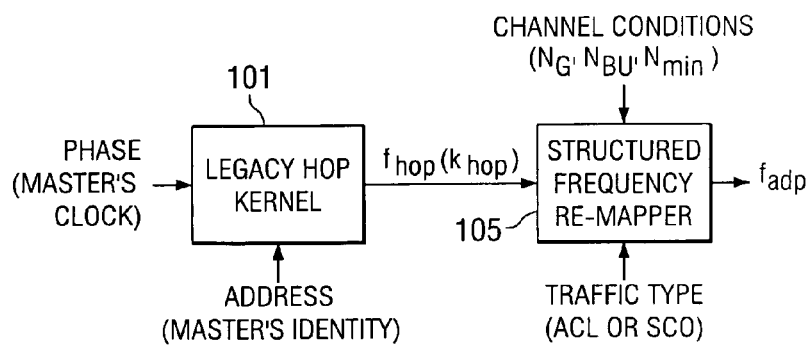
FIG. 1C is a block diagram of one embodiment of an adaptive frequency hopping scheme.

FIG. 1C is a block diagram of one embodiment of an adaptive frequency hopping scheme. A structured frequency re-mapper 105 examines the selected channel's channel condition (good or bad) as well as the selected channel's traffic type (ACL or SCO). When it is desired to use good channels, when good channels are selected by the Legacy Hop Kernel 101 pass to the structured frequency re-mapper 105 they are used by the network, while bad channels from the Legacy Hop Kernel 101 are re-mapped using a set of good channels to produce a good channel for the network.

Similarly, when a bad channel is desired, if a bad channel is produced by the Legacy Hop Kernel 101, then that bad channel is kept and used as the selected channel for the network, while a good channel produced by the Legacy Hop Kernel 101 is "removed" via the structured frequency re-mapper 105 and a bad channels is selected by the good channel being re-mapped onto the set of bad channels.

In general, the optimal window lengths (WG(i) and WB(i)) for FIG. 1C depend upon the number of good channels in the band (NG) and the minimum number of hopping channels that can be used (Nmin). Once the window lengths have been defined, they can be used as an input to a slight modified re-mapping function (discussed in more detail in FIG. 4), which ultimately generates the adaptive hopping sequence with the specified structure.

Figure 1D:
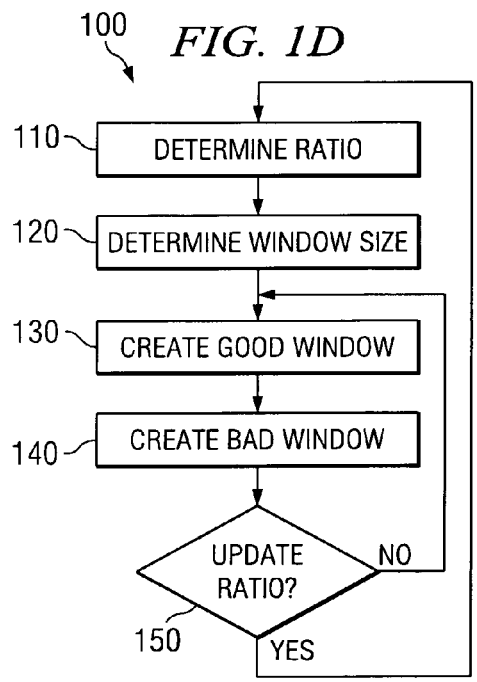
FIG. 1D illustrates a method for organizing channels as a channel organization algorithm.

A specific channel hopping sequence according to the invention can be better understood by reference to the figures. Accordingly, FIG. 1D illustrates a method for organizing channels embodied as a look-ahead algorithm 100. First, in a determine ratio act 110, a ratio "Q" of the number of good channels "n" to the number of bad channels "m" is determined. This maybe done in one embodiment by sampling each channel in a frequency band, and then defining the channel as good or bad based on some predetermined factor, such as the signal to noise ratio (SNR). The ratio of the number of good channels to the number of bad channels in a frequency band is generally illustrated by the following equation:

$$Q = \frac{n}{m} = \frac{\# \text{ of good channels}}{\# \text{ of bad channels}}$$

For example, there are a total of seventy nine Bluetooth channels. Assume there are sixty good channels in the environment, then there are nineteen bad channels. The ratio of the size of the good window to the size of the bad window should be chosen so that it is proportioned to sixty to nineteen. Since the nineteen bad channels are preferably rounded to an even window size, then the ratio should over time average sixty to nineteen. Accordingly, the actual ratio of good channels to bad channels will vary between sixty good channels to eighteen bad channels, to sixty good channels to twenty bad channels.

Figure 2:
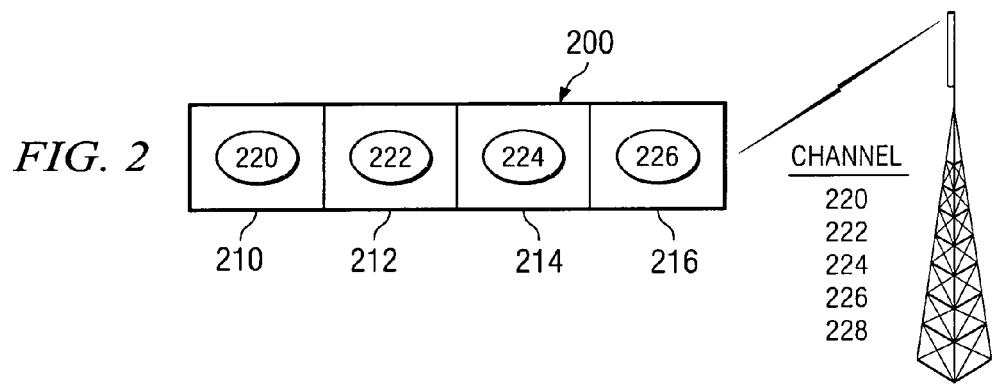
FIG. 2 illustrates a window.

FIG. 2 illustrates a window 200. Window 200 is generally a collection of time periods depicted as slots 210–216, and each slot may be associated with a channel 220–228. Thus, the window is said to have slots, such that one slot corresponds to each channel. In general, the window is said to have a size equal to the number of slots that make up the window. Usually, the channels of the window are preferably sequentially accessed in time.

Next, in a determine window size act 120, a size for a good window and a corresponding size of a bad window is selected such that the ratio Q is the size of the good window to the size of the bad window. The actual size of each window will depend on the specific network, as well as the specific size of the data packets being transmitted in the network and other factors. Similarly, the size of the window of good channels determines the traffic type that can be supported for that particular environment. For example, Bluetooth can occupy one, three or five slots. So if a window size of two slots is selected for the good window, then three slot packets or five slot packets cannot be reliably transferred. Preferably, the number of good channels is an even number, which may be obtained by rounding to the next higher even number, or by truncating to the next lower even number.

A create good window act 130 then generates a window of good channels (the good window). Preferable, a good window is generated by first sampling a channel, which may be selected via the original channel hopping sequence, randomly, sequentially or otherwise, depending on the protocol selected. Then, if a bad channel is detected, it is ignored, and all bad channels that are detected are ignored until a window of good channels is filled. When a good channel is detected it is then assigned to a first channel slot. The next detected good channel is then assigned to the second channel slot and so on until a good channel is assigned to each channel slot in the good window.

Then, similarly, a create bad window act 140 generates a window of bad channels. The bad window act 140 looks in the next channel in the original hopping sequence and so on until it finds a bad channel, however, any other channel hopping sequence may be used. During the bad window act 140, detected good channels are ignored. A bad window is generated by detecting a bad channel, and then assigning that channel to the first channel slot in the bad window. The next detected bad channel is then assigned to the second channel slot of the bad window and so on until a bad channel is assigned to each channel slot in the bad window.

The look-ahead algorithm 100 then returns to the create good window act 130, so that an additional good window of good channels may be created. However, it should be noted that prior to assigning a channel to a window each channel is preferably again sampled so that a bad channel will not likely be assigned to a good window, and so that a good channel will not likely be assigned to a bad window. Periodically, the look-ahead algorithm 100 updates the ratio (Q) via an update ratio query 150, either by using the data collected while sampling channels, or by sampling the channels by returning to the determine ratio act 110. Eventually, a new hopping sequence (or adapted hopping sequence) is built where a window of 2n good channels, is followed by a window of 2m bad channels, is followed by a window of 2n good channels, is followed by window of 2m bad channels, and so on. Then, a wireless device, such as a Bluetooth device, uses the new channel hopping sequence.

Preliminary Exemplary Implementation

Figure 3:
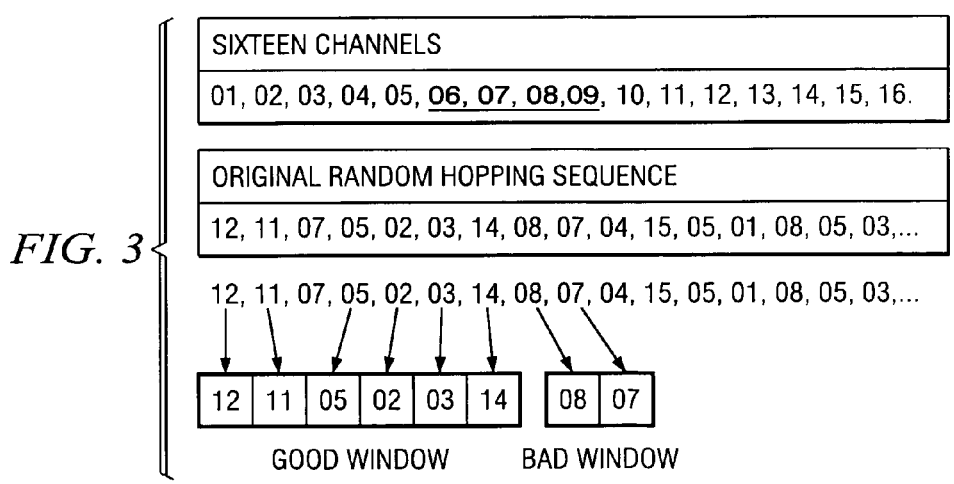
FIG. 3 illustrates an exemplary implementation of the invention.

FIG. 3 illustrates an exemplary implementation of the invention (a more detailed exemplary implementation is discussed later in this application). The hypothetical network of FIG. 3 has sixteen channels (which is unrealistically small, but good for illustrative purposes). In this example it is assumed that the ratio of good channels to bad channels is three to one. Assume the algorithm selects a bad window size of two bad channels, and a good window size of six good channels. Note that for the network of sixteen channels, the window sizes match the network nicely. Note also that as long as the ratio is correct, it does not matter what window size is chosen, however, a long bad window is not desired because the bad window translates into a period of silence (particularly for Bluetooth) when no data is likely to be transmitted. Assume also that one slot packets are used across the network (such as a DMI Bluetooth packet).

Accordingly, there are sixteen channels:

Channels: 01, 02, 03, 04, 05, 06, 07, 08, 09, 10, 11, 12, 13, 14, 15, 16.

Also assume that these channels have an original random hopping sequence:

Original HS: 12, 11, 07, 05, 02, 03, 14, 08, 07, 04, 15, 05, 01, 08, 05, 03

Assume that channels 6 through 9 are bad. The hopping sequence randomly hops over these 16 different frequencies. It is first desired to build a good window. The first channel in the hopping sequence is 12. Channel 12 is a good channel, and since a good channel is needed for the good window, so channel 12 is assigned to the first slot of the first window to begin to create the new hopping sequence. The next channel in the original hopping sequence is 11. Channel 11 is a good channel so it is also used that in the good window. The next channel in the hopping sequence is channel 7, which is a bad channel. Accordingly, it is not used. So, channel 7 is bypassed and discarded, and the next channel in the original hopping sequence is examined.

The next channel is channel 5, which happens to be a good channel and is assigned to the good window. This process continues with the original hopping sequence until channel 14, which is also a good channel. The assignment of channel 14 to the new hopping sequence completes the good window (6 good channels in a row).

Next, a bad window is built. The bad window requires two bad channels. The next channel after channel 14 is channel 8, which is a bad channel. It is thus the first bad channel of the bad window. The next channel in the original hopping sequence is Channel 7. Channel 7 is a bad channel, so it is assigned to the bad window and the bad window construction is completed.

Next, a new good window is built, needing six good channels. The next channel after channel 7 is channel 4. Channel 4 is a good channel, so it is assigned to the good window. The next channel is channel 15, which is a good channel and is assigned to the good window. Channel 5 is a good channel, as is the next channel (channel 1). These are assigned to the good window. The next channel is channel 8, which is a bad channel, so it is discarded since the good window must be completed before another bad channel will be needed. The next two channels are channel 5 and channel 3, which are a good channels. Now, the slots of the good window are completely filled. This process is repeated over and over again.

Use of Windows

Figure 4:
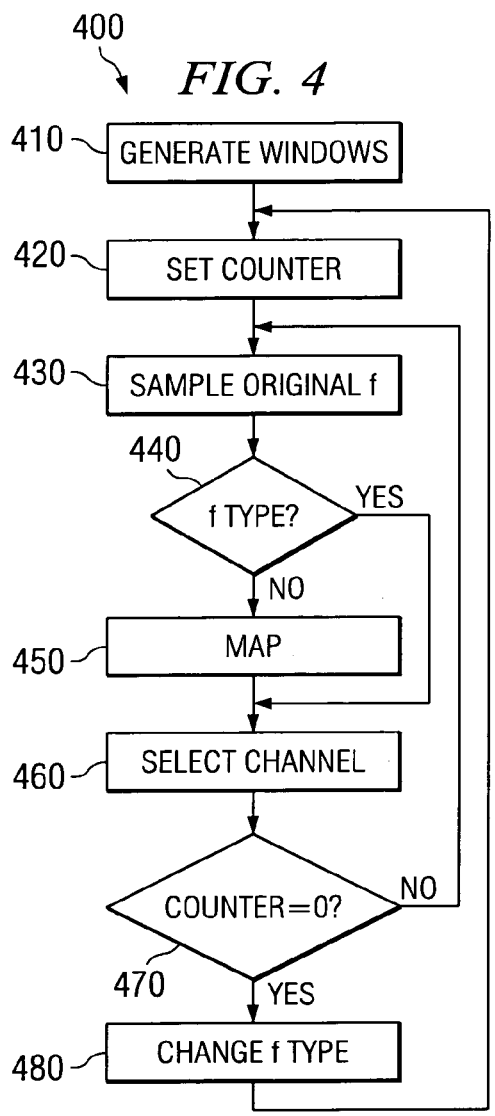
FIG. 4 provides an embodiment of a channel generation algorithm.

FIG. 4 provides an embodiment of a channel generation algorithm 400 (the algorithm 400). First, in a generate windows act 410, the ratio of the number of good channels to the number of bad channels (the ratio Q) is determined. Also in the generate windows act 410 windows of good channels and windows of bad channels are generated so that the ratio of the width of the good window to the width of the bad window is equal to the ratio Q. In one embodiment, this is done as discussed in the look-ahead algorithm 100.

Note that the size of the good window and the size of the bad window is governed by the ratio Q. The ratio Q is also used to determine how many channels are to use "good channels" and how many channels are to use "bad channels". Let G be a number of desired good channels, and B be a number of desired bad channels, so that the ration G/B is Q. Next, in a set counter act, a counter variable C is set to some integer N times G, or some integer N times B (depending on whether one is transmitting across a series of good channels or across a series of bad channels).

Assume one wishes to build a bad channel. After the counter value is chosen in the set counter act C (which is here, some NB), the algorithm 400 proceeds to a sample original frequency act 430. In the sample original frequency act 430 the original hopping sequence is used to produce a chosen frequency "f". Then, in a f-type query 440, if the frequency f is already in the class of "bad channels" (as illustrated by the "y" decision), then f is used as the next channel of transmission via the select channel act 460. However, if in the f-type query 440 f is in the class of "good channels" (as illustrated by the "n" decision), then the algorithm 400 proceeds to find an appropriate channel.

In a map act 450, the original frequency f is mapped to another frequency known to be of the type desired (or, alternatively, f is discarded and anew frequency of the desired type is chosen, preferably randomly, or as a next-in ascending sequence order). According, the map act 450 selects an appropriate frequency for the type of channel that is desired for transmission, and this appropriate frequency is selected for use as the next channel in the select channel act 460.

In the select channel act 460, the counter C is decremented so that in a counter query 470 it can be determined whether another frequency of the type currently being sought is needed. If the counter does not equal zero, as shown by the n decision, then the algorithm 400 returns to the sample original f act 430. If, however, the counter query finds that C=0, then the algorithm 400 proceeds to a change function type act 480 (shown by the y decision) so that the type of channel being used can be changed. This preserves the ratio Q. Following the change function type act 480, the algorithm returns to the set counter act 420. The algorithm preferably proceeds as long as channels of transmission are needed.

Figure 5A:
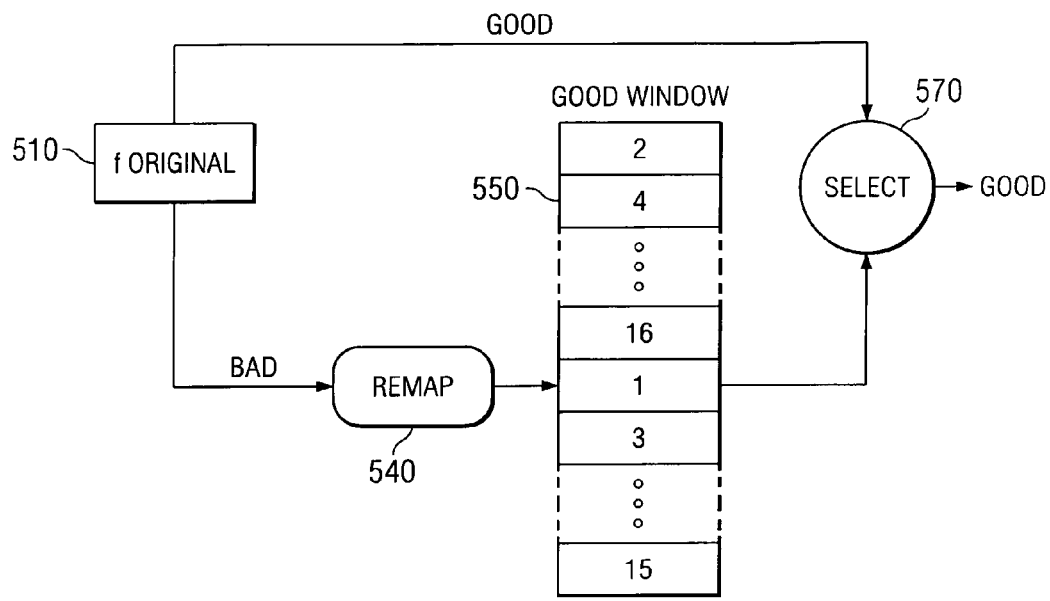
FIG. 5a is a logical block-diagram of a channel selection process to aid in understanding the exemplary discussion of channel generation.

FIG. 5*a* is a logical block-diagram of a channel selection process to aid in understanding an exemplary discussion of channel generation according to the algorithm 400. In FIG. 5*a*, a good channel is selected for transmission. Note that a good window 550 has already been constructed, and the good window 550 is comprised of even numbered good channels, sequentially ordered, followed by odd numbered good channels, also sequentially ordered. As shown in FIG. 5*a*, an original frequency f is generated in a frequency-original block 510. If f is a good frequency, then f is immediately designated as the channel to be used by a select block 570. If f is a bad frequency, then a re-map block 540 selects a new frequency to use from the channels in the good window 550. Thus, the selected good channel is used by the select block 570 as the next channel of transmission. Accordingly, a good channel is always on the output when a good channel is sought.

Figure 5B:
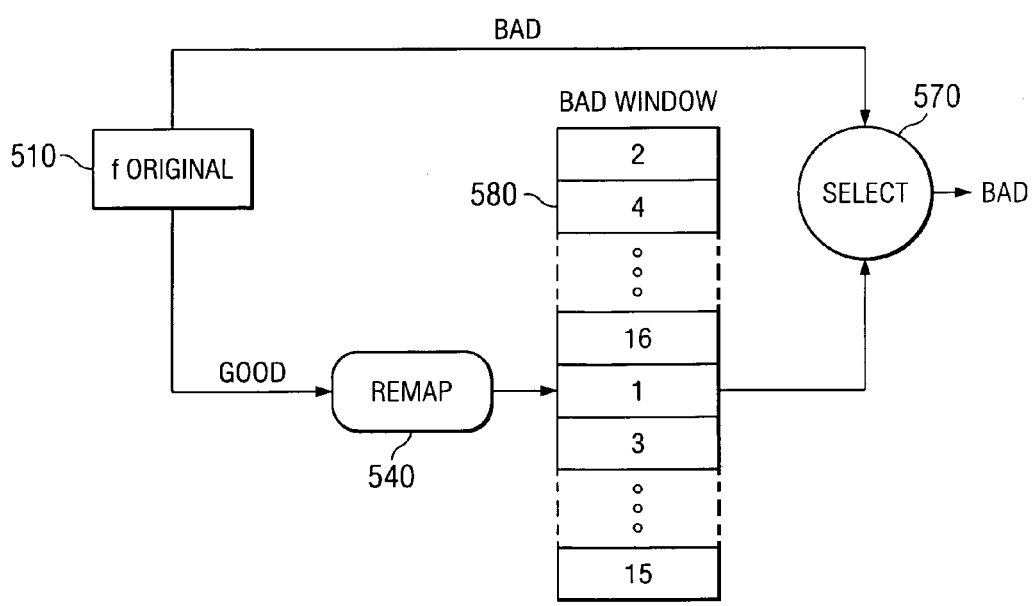
FIG. 5b is a logical block-diagram of a channel selection process that illustrates the mapping of bad channels.

FIG. 5*b* is a logical block-diagram of a channel selection process that illustrates the mapping of bad channels according to the algorithm 400. In FIG. 5*b*, a bad channel is selected for transmission. Note that a bad window 580 has already been constructed, and the bad window 580 is comprised of even numbered bad channels, sequentially ordered, followed by odd numbered bad channels, also sequentially ordered. As shown in FIG. 5*b*, an original frequency f is generated in a frequency-original block 510. If f is a bad frequency, then f is immediately designated as the channel to be used by a select block 570. If f is a good frequency, then a re-map block 540 selects a new frequency to use from the channels in the bad window 580. Thus, the selected bad channel is used by the select block 570 as the next channel of transmission. Accordingly, a bad channel is always on the output when a bad channel is sought.

Figure 6A:
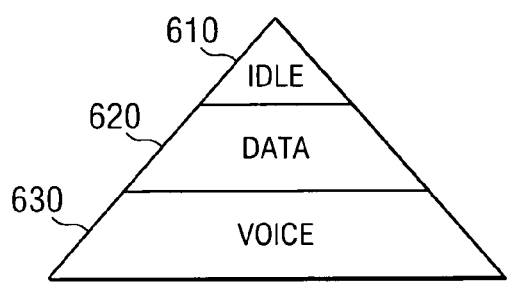
FIG. 6a shows a pyramid that illustrates a preferred hierarchy of traffic-based channel types for use by a bad channel.

During times when bad channels are being "used," it is desirable to minimize the importance of the information being transferred. FIG. 6*a* shows a pyramid that illustrates a preferred hierarchy of traffic-based channel types for use by a bad channel. Since idle time involves the transmission of no data or voice, it is most preferred to designate idle time 610, if any, for time periods designated to "bad" channels. Data 620 is in the middle of the transmission hierarchy because although any degradation in data that makes a data packet un-receivable, a bad data transmission may be detected, and the data retransmitted, via an ARQ protocol. Voice is not retransmitted, and so if voice is lost, it will not be transmitted again. Accordingly, voice 630 is at the bottom of the preferred transmission hierarchy.

Figure 6B:
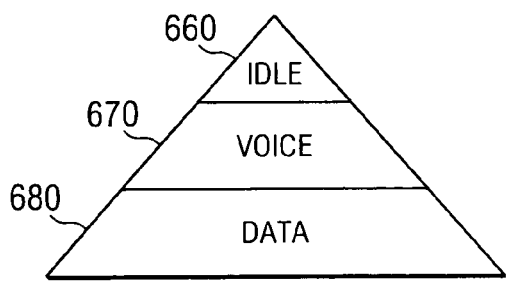
FIG. 6b shows a pyramid that illustrates an alternative hierarchy of traffic-based channel types for use by a bad channel.

FIG. 6*b* shows a pyramid that illustrates an alternative hierarchy of traffic-based channel types for use by a bad channel. Since idle time involves the transmission of no data or voice, it is most preferred to designate idle time 660, if any, for time periods designated to "bad" channels. Since voice reception does not have to be complete to be audible, the transmission of voice 670 during bad channels is less desirable than using an idle slot 660. If, however, no idle slots are designated for transmission, and if system requirements are such that something be transmitted, then it is more preferable to transmit voice 670 than data 680. Data 680 is at the bottom of the transmission hierarchy because any degradation in data that makes a data packet un-receivable forces the retransmission of the data packet, and brings with it added overhead.

Detailed Exemplary Implementation

Suppose a spectrum's channels are sampled, and classified. Suppose it is found that channels 0 through 47 are good, and channels 48 through 78 are bad. Thus, there are a total of 48 good channels (NG=48), and 31 bad channels (NB=31) in the band. Also suppose that a hypothetical Bluetooth network has to hop over only 72 channels (Nmin=72). One would likely decide to use all of the good channels and only some of the bad channels. Arbitrarily, channels 48 through 71 (NBU=24) are selected for use, and channels 72 through 78 (NBR=7) are never used in the adapted hopping sequence.

Recall that an example of a structure of adaptive hopping sequence that satisfies these channel conditions is shown in FIG. 4. In this case, the ratio of good channels to bad channels in the adapted hopping sequence matches the channel conditions. With this structure, one can find a structure that matches the channel conditions. An example of a hopping sequence produced by a legacy device (typically a random hopping sequence) is shown below:

Original HS: 8, 66, 10, 12, 19, 14, 52, 74, 37, 70, 1, 18, 5, 20, 50, 5, 33, 16, . . .

FIG. 4 starts with a good window of six channels. The first channel in the present original hopping sequence is 8. Since channel 8 is a good channel, no re-mapping is required. Therefore, channel 8 is assigned to the first slot in the adapted hopping sequence. The next channel in the present original hopping sequence is 66. Channel 66 is classified to be a bad channel. Since a good channel is needed in the window, Channel 66 is re-mapped on to the set of good channels. The re-mapping is done according to FIG. 5, where the upper-half of the table contains the even good channels listed in ascending order, and the lower-half of the table contains the odd good channels listed in ascending order.

The index for this table starts at 0 and ends at NG−1. In this example, the re-mapping function (540) is as follows: k=(1+CLK+f) mod NG, where k is the index to the table of good channels, CLK is the Bluetooth master's clock, f is the frequency that needs to be re-mapped and NG is the number of good channels. Assume that the Bluetooth master's clock (CLK) started at 0 and is incremented by one at each slot. Thus, the clock has the following clock sequence:

CLK: 0, 1, 2, 3, 4, 5, 6, 7, 8, 9, 10, 11, 12, 13, 14, 15, 16, 17, . . .

Although this clock is sequential, it is chosen arbitrarily. In practice, any time-varying signal can be used.

For channel 66, the output of the re-mapping function is k=(1+1+66) mod 48=20. Using this index, one can determine the re-mapped frequency by doing a table look-up. In this case, k=20 points to channel 40. Therefore, channel 40 is assigned to the second slot in the adapted hopping sequence. The next 4 channels do not need re-mapping since there are good channels. Therefore, channels 10, 12, 19, and 14 are assigned to the next four slots of the adapted hopping sequence. The adapted hopping sequence now has 6 good channels.

Next, a bad window is built. This bad window requires 4 bad channels. The next channel in the original hopping sequence is 52. Since channel 52 is in the set of bad channels, no re-mapping is required. Therefore, channel 52 is assigned to the next slot in the adapted hopping sequence. The next channel in the original hopping sequence is 74. This channel is a bad channel, but it is not in the set of the bad channels. Therefore, this channel needs to be re-mapped to the set of bad channels.

The re-mapping is done according to FIG. 6, where the upper-half of the table contains the even bad channels listed in ascending order, and the lower-half of the table contains the odd bad channels listed in ascending order. The index for this table starts at 0 and ends at NBU−1. In this example, the re-mapping function (640) is as follows: k=(1+CLK+f) mod NBU, where k is the index to the table of good channels, CLK is the Bluetooth master's clock, f is the frequency that needs to be re-mapped and NBU is the number of bad channels that are to be kept in the adapted hopping sequence. For channel 74, the output of the re-mapping function is k=(1+7+74) mod 24=10. Using this index, one can determine the re-mapped frequency by using a look-up table. In this case, k=10 "points" to channel 68. Therefore, channel 68 is assigned to the next slot in the adapted hopping sequence. The next channel in the original hopping sequence is 37. This channel is a good channel, and therefore needs to be re-mapped.

For channel 37, the output of the re-mapping function is k=(1+8+37) mod 24=22. In this case, k=22 points to channel 69. Therefore, channel 69 is assigned to the next slot in the adapted hopping sequence. The next channel in the original hopping sequence is 70. Since this channel is in the set of bad channels that are to be kept, no re-mapping is required. Therefore, channel 70 is assigned to the next slot in the adapted hopping sequence. This completes the first bad window.

Next, a good window of length 6 is built. The next 4 channels 1, 18, 5, and 20 are all good channels. These channels do not require any re-mapping. Thus, these channels are used in next 4 slots of the adapted hopping s sequence. The next channel in the adapted hopping sequence is 50. This channel is a bad channel and therefore needs re-mapping. For channel 50, the output of the re-mapping function is k=(1+14+50) mod 48=17. In this case, k=17 points to channel 34. Therefore, channel 34 is assigned to the next slot in the adapted hopping sequence. The next channel in the original hopping sequence is 5. Since channel 5 is good, no re-mapping is required. Therefore, channel 5 is used in the next slot in the adapted hopping sequence.

Next, a bad window of length 2 is built. The next two channels (33 and 16) in the original hopping sequence are both good. Since bad channels are needed, these two good channels need to be re-mapped. For channel 33, the output of the re-mapping function is k=(1+16+33) mod 24=2. In this case, k=2 points to channel 52. Therefore, channel 52 is assigned to the next slot in the adapted hopping sequence. For channel 16, the output of the re-mapping function is k=(1+17+16) mod 24=10. In this case, k=10 points to channel 68. Therefore, channel 68 is assigned to the next slot in the adapted hopping sequence.

Now the process starts over again. A good window of length 6 is needed. This process is repeated over and over again until the structure adaptive frequency hopping mechanism is turned off. The adapted hopping sequence for this example looks like:

Remapped HS: 8, 40, 10, 12, 19, 14, 52, 68, 69, 70, 1, 18, 5, 20, 34, 5, 52, 68, . . .

Closing Notes

Sometimes methods of the invention may be practiced by placing the invention on a computer-readable medium. Computer-readable mediums include passive data storage, such as a random access memory (RAM) as well as semi-permanent data storage such as a compact disk read only memory (CD-ROM). In addition, the invention may be embodied in the RAM of a computer and effectively transform a standard computer into a new specific computing machine.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

We claim:

1. In a frequency band, a method of intelligent frequency hopping, comprising:
   generating a good window and a bad window;
   determining a desired frequency type based on a frequency sequence;
   using an original hopping sequence to sample an original frequency in the frequency band;
   selecting the original frequency as an operating frequency when the original frequency is the desired frequency type;
   mapping the original frequency to the desired frequency type when the original frequency is not the desired frequency type, wherein generating comprises:
      determining a number of good channels and a number of bad channels in the frequency band;
      defining a ratio of good channels to bad channels as a ratio, Q (the ratio); and
      defining a good window size as the number of good channels, defining a bad window size as the number of bad channels, such that a ratio of the good window size to the bad window size is Q.

2. The method of claim 1 further comprising: using a frequency from the good window when the original frequency is not the desired frequency type, and the desired frequency type is a good frequency.

3. The method of claim 1 further comprising using a frequency from the bad window when the original frequency is not the desired frequency type and the desired frequency type is a bad frequency.

4. The method of claim 1 wherein the frequency sequence is defined as a number of channels of a first type, followed by a number of channels of a second type, such that the ratio of the number of channels of the first type to the number of channels of the second type is Q.

5. The method of claim 1 wherein the frequency sequence is defined as a number of channels of a first type, followed by a number of channels of a second type, such that the ratio of the number of channels of the first type to the number of channels of the second type is 1/Q.

6. The method of claim 4 wherein the first type is a good channel and the second type is a bad channel.

7. The method of claim 5 wherein the first type is a bad channel and the second type is a good channel.

8. The method of claim 1 further comprising:
   sampling a plurality of channels in the frequency band;
   identifying each channel in the plurality of channels as a good channel or a bad channel as a function of a predetermined factor; and
   assigning the good channels to the good window and the bad channels to the bad window.

9. The method of claim 1 wherein sampling the plurality of channels samples all channels available to a network.

10. The method of claim 1 wherein the good channel is defined as a channel having at least a predetermined Quality Level of Service.

11. The method of claim 1 wherein the bad channel is defined as a channel having less than a predetermined Quality Level of Service.

12. The method of claim 1 wherein each of the good and bad windows has an even number of slots to which channels may be assigned.

13. The method of claim 1 further comprising an act of assigning a first size to the good window, and a second size to the bad window, such that the ratio of the size of the good window to the size of the bad window is approximately the same as the ratio of a number of the good channels in the band to a number of the bad channels in the frequency band (the ratio) over time.

14. The method of claim 1 further comprising detecting a good channel, and ignoring the good channel when the bad window is being generated.

15. The method of claim 2 wherein using a frequency comprises:
using all channels in the good window before using any channel in the bad window.

16. In a frequency band, a method of intelligent frequency hopping, comprising:
identifying each channel in the frequency band as a good channel or a bad channel;
determining a ratio of a number of the good channels to a number of the bad channels (the ratio);
assigning a first size to a good window, and a second size to a bad window, such that the ratio of the size of the good window to the size of the bad window is the same as the ratio;
assigning the good channels to the good window and the bad channels to the bad window;
determining a desired frequency type based on a frequency sequence;
using an original hopping sequence to sample an original frequency in the frequency band; and
selecting the original frequency as an operating frequency when the original frequency is the desired frequency type.

17. The method of claim 16 wherein the frequency sequence is defined as a number of channels of a first type, followed by a number of channels of a second type, such that the ratio of the number of channels of the first type to the number of channels of the second type is Q.

18. The method of claim 16 further comprising transmitting an idle signal when the bad channel is selected.

19. In a frequency band, a method of intelligent frequency hopping, comprising:
in the frequency band, determining a ratio of a number of good channels to a number of bad channels (the Q ratio);
assigning a first size to a good window, and a second size to a bad window, such that a ratio of the size of the good window to the size of the bad window is the same as the Q ratio;
defining a frequency sequence as a number of channels of a first type, followed by a number of channels of a second type, such that a ratio of the number of channels of the first type to a number of channels of the second type is the Q ratio;
using an original hopping sequence to sample an original frequency in the frequency band;
selecting the original frequency as an operating frequency when the original frequency is a desired frequency type; and
using a frequency from either the good window or the bad window as an operating frequency when the original frequency is not the desired frequency type.

* * * * *